(12) United States Patent
Mc Duffey

(10) Patent No.: US 6,273,374 B1
(45) Date of Patent: *Aug. 14, 2001

(54) COMPUTER MONITOR MEMO HOLDER

(76) Inventor: James Mc Duffey, 30515 Knighton Dr., Farmington Hills, MI (US) 48331

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,981

(22) Filed: Jun. 11, 1998

(51) Int. Cl.[7] ................................................. A47G 1/17
(52) U.S. Cl. ................ 248/205.3; 248/918; 248/451; 248/442.2; 281/44; 281/45
(58) Field of Search .................. 248/918, 442.2, 248/450, 451, 441.1, 447.1, 205.3, 221.11; 281/44, 45, 48, 29, 19.1, 12, 15.1

(56) References Cited

U.S. PATENT DOCUMENTS

| | | |
|---|---|---|
| D. 367,857 | 3/1996 | Emmerik . |
| D. 393,004 * | 3/1998 | Foster ...................................... D19/91 |
| 2,146,465 | 2/1939 | Coppock . |
| 3,099,269 * | 7/1963 | Sorensen ................................ 129/37 |
| 3,539,204 * | 11/1970 | Keller ..................................... 281/45 |
| 4,243,249 * | 1/1981 | Goss ........................................ 281/1 |
| 4,563,796 * | 1/1986 | Kettlestrings ........................... 24/563 |
| 4,693,443 * | 9/1987 | Drain .................................. 248/447.1 |
| 4,869,565 * | 9/1989 | Bachman ............................. 312/234 |
| 5,104,087 | 4/1992 | Wentzloff et al. . |
| 5,226,676 * | 7/1993 | Su ........................................... 281/45 |
| 5,285,952 * | 2/1994 | Ho .......................................... 229/1.5 |
| 5,301,915 | 4/1994 | Bahniuk et al. . |
| 5,383,642 * | 1/1995 | Strassberg ........................... 248/442.2 |
| 5,499,793 * | 3/1996 | Salansky ............................. 248/442.2 |
| 5,533,702 * | 7/1996 | Koch .................................. 248/442.2 |
| 5,664,673 * | 9/1997 | Perry ..................................... 206/371 |
| 5,678,792 | 10/1997 | Arguin et al. . |
| 5,718,402 * | 2/1998 | Hoffman et al. .................. 248/205.3 |
| 5,743,565 * | 4/1998 | Zimmanck ............................. 281/44 |
| 5,765,873 * | 6/1998 | Chen ....................................... 281/45 |
| 5,769,374 * | 6/1998 | Martin et al. .................... 248/221.11 |
| 5,810,316 * | 9/1998 | Eby ....................................... 248/451 |
| 5,848,772 * | 12/1998 | Fitzgerald ........................... 248/205.3 |
| 5,865,469 * | 2/1999 | Chin ....................................... 281/45 |
| 5,881,986 * | 3/1999 | Hegarty .............................. 248/442.2 |
| 5,901,937 * | 5/1999 | Compeau et al. ................. 248/442.2 |
| 5,931,437 * | 8/1999 | Neuhof et al. ..................... 248/442.2 |

* cited by examiner

Primary Examiner—Ramon O. Ramirez
Assistant Examiner—Kimberly Wood
(74) Attorney, Agent, or Firm—Carlson, Gaskey & Olds

(57) ABSTRACT

An apparatus is provided including at least one mounting assembly coupled to a computer monitor for removably mounting a sheet of paper in coplanar relationship with a screen of the computer monitor.

16 Claims, 2 Drawing Sheets

COMPUTER MONITOR MEMO HOLDER

BACKGROUND OF THE INVENTION

1. Field of the Invention

The present invention relates to computer memorandum boards and more particularly pertains to a new computer monitor memo holder for mounting various sheets of paper or the like about a periphery of a computer monitor screen.

2. Description of the Prior Art

The use of computer memorandum boards is known in the prior art. More specifically, computer memorandum boards heretofore devised and utilized are known to consist basically of familiar, expected and obvious structural configurations, notwithstanding the myriad of designs encompassed by the crowded prior art which have been developed for the fulfillment of countless objectives and requirements.

Known prior art computer memorandum boards and the like include U.S. Pat. No. 5,499,793; U.S. Pat. No. 5,301,915; U.S. Pat. Des. 367,857; U.S. Pat. No. 5,678,792; U.S. Pat. No. 5,104,087; and U.S. Pat. No. 2,146,465.

In these respects, the computer monitor memo holder according to the present invention substantially departs from the conventional concepts and designs of the prior art, and in so doing provides an apparatus primarily developed for the purpose of mounting various sheets of paper or the like about a periphery of a computer monitor screen.

SUMMARY OF THE INVENTION

In view of the foregoing disadvantages inherent in the known types of computer memorandum boards now present in the prior art, the present invention provides a new computer monitor memo holder construction wherein the same can be utilized for mounting various sheets of paper or the like about a periphery of a computer monitor screen.

The general purpose of the present invention, which will be described subsequently in greater detail, is to provide a new computer monitor memo holder apparatus and method which has many of the advantages of the computer memorandum boards mentioned heretofore and many novel features that result in a new computer monitor memo holder which is not anticipated, rendered obvious, suggested, or even implied by any of the prior art computer memorandum boards, either alone or in any combination thereof.

To attain this, the present invention generally comprises a computer monitor having a housing including a front face with a screen mounted thereon. A frame is thus defined about the screen which includes a top portion, a bottom portion and a pair of side portions. Each portion has a flat surface which resides in coplanar relationship with respect to each other. As best shown in FIGS. 1 & 2, three mounting assemblies are provided each including a rear plate with a generally rectangular configuration. The rear plate is defined by a front surface, a rear surface and a periphery formed of a pair of elongated side edges and a pair of short end edges. Each mounting assembly further includes a side plate with a generally rectangular configuration also defined by a front surface, a rear surface and a periphery. Similar to the rear plate, the periphery of the side plate is formed of a pair of elongated side edges and a pair of short end edges. The end edges of the side plate each have a length ¼ that of the end edges of the rear plate. An inboard one of the side edges of the side plate is integrally coupled to one of the side edges of the rear plate and extends therefrom in perpendicular relationship therewith. with reference still to FIGS. 1 & 2, each mounting assembly further includes a front plate defining a portion of a cylinder. The front plate is equipped with a length equal to that of the side plate and rear plate. Further, the front plate has a periphery formed of a pair of elongated side edges and a pair of short end edges. One of the side edges of the front plate is integrally coupled to an outboard one of the side edges of the side plate. Another one of the side edges of the front plate remains in abutment with a central extent of the front surface of the rear plate. As such, a groove is defined with a triangular shaped cross-section along a length thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer monitor memo holder apparatus and method which has many of the advantages of the computer memorandum boards mentioned heretofore and many novel features that result in a new computer monitor memo holder which is not anticipated, rendered obvious, suggested, or even implied by any of the prior art computer memorandum boards, either alone or in any combination thereof.

It is another object of the present invention to provide a new computer monitor memo holder which may be easily and efficiently manufactured and marketed.

It is a further object of the present invention to provide a new computer monitor memo holder which is of a durable and reliable construction.

An even further object of the present invention is to provide a new computer monitor memo holder which is susceptible of a low cost of manufacture with regard to both materials and labor, and which accordingly is then susceptible of low prices of sale to the consuming public, thereby making such computer monitor memo holder economically available to the buying public.

Still yet another object of the present invention is to provide a new computer monitor memo holder which provides in the apparatuses and methods of the prior art some of the advantages thereof, while simultaneously overcoming some of the disadvantages normally associated therewith.

Still another object of the present invention is to provide a new computer monitor memo holder for mounting various sheets of paper or the like about a periphery of a computer monitor screen.

Even still another object of the present invention is to provide a new computer monitor memo holder that includes at least one mounting assembly coupled to a computer monitor for removably mounting a sheet of paper in coplanar relationship with a screen of the computer monitor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
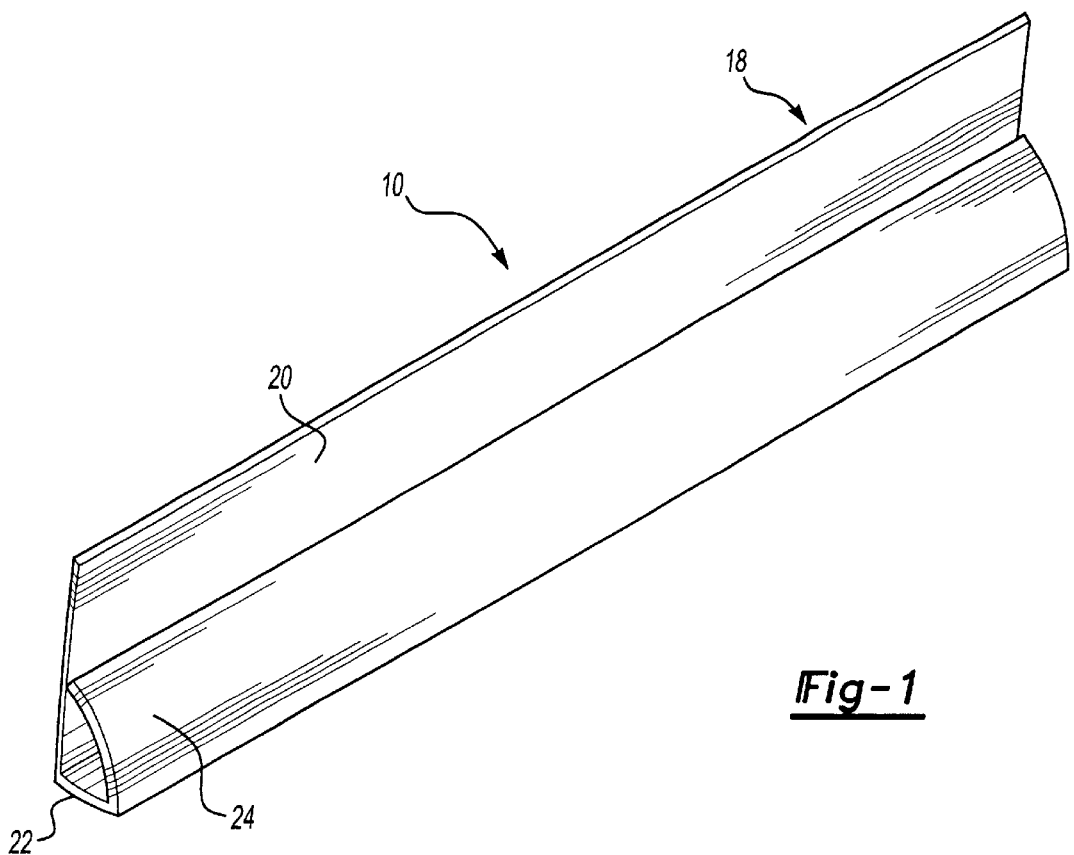
FIG. 1 is a front view of a new computer monitor memo holder according to the present invention.
Figure 2:
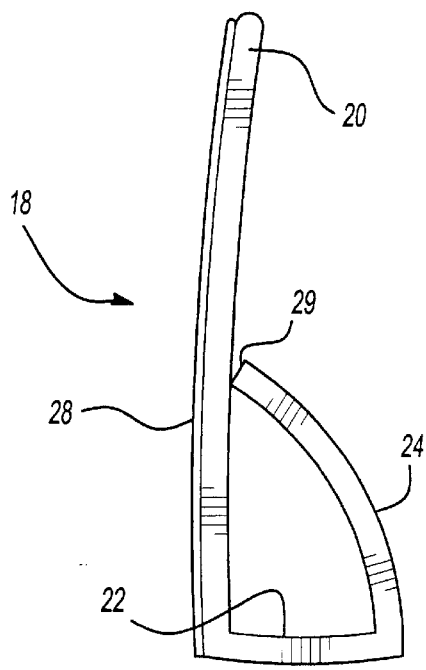
FIG. 2 is a perspective view of one of the mounting assemblies of the present invention.
Figure 3:
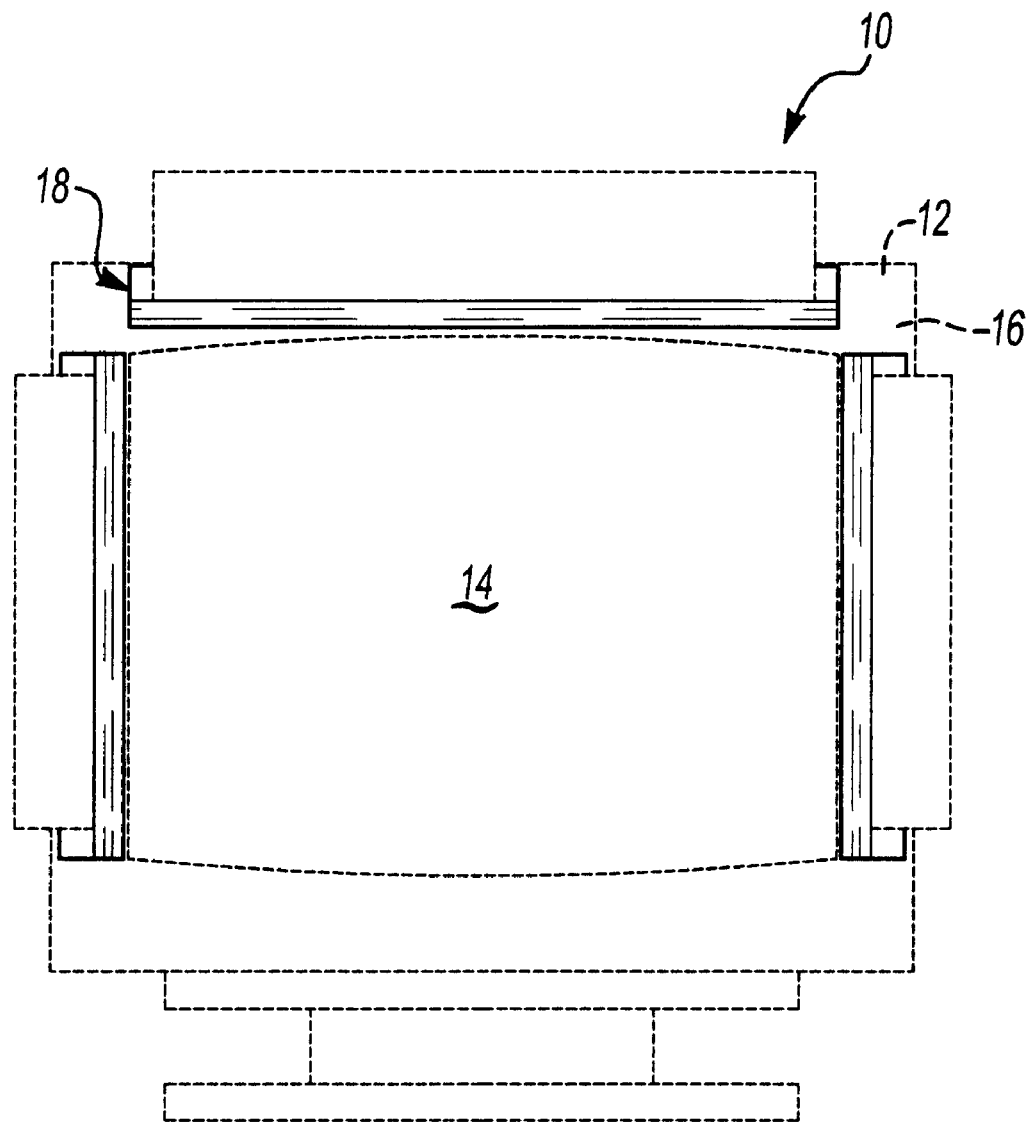
FIG. 3 is a side view of one of the mounting assemblies of the present invention.

With reference now to the drawings, and in particular to FIGS. 1 through 3 thereof, a new computer monitor memo holder embodying the principles and concepts of the present invention and generally designated by the reference numeral 10 will be described.

The present invention, designated as numeral 10, is adapted for use with a computer monitor 12 having a housing including a front face with a screen 14 mounted thereon. A frame 16 is thus defined about the screen which includes a top portion, a bottom portion and a pair of side portions. Each portion has a flat surface which resides in coplanar relationship with respect to each other and the screen.

As best shown in FIGS. 1 & 2, three mounting assemblies 18 are provided each including a rear plate with a generally rectangular configuration. The rear plate 20 is defined by a front surface, a rear surface and a periphery formed of a pair of elongated side edges and a pair of short end edges. In the preferred embodiment, the rear plate defines a portion of a cylinder with a very large radius of curvature, namely 82.4 millimeters.

Each mounting assembly further includes a side plate 22 with a generally rectangular configuration also defined by a front surface, a rear surface and a periphery. Similar to the rear plate, the periphery of the side plate is formed of a pair of elongated side edges and a pair of short end edges. The end edges of the side plate each have a length ¼ that of the end edges of the rear plate. An inboard one of the side edges of the side plate is integrally coupled to one of the side edges of the rear plate and extends therefrom in perpendicular relationship therewith. In the preferred embodiment, the side plate defines a portion of a cylinder with a radius of curvature of about 10 millimeters.

With reference still to FIGS. 1 & 2, each mounting assembly further includes a front plate 24 defining a portion of a cylinder with a radius of curvature of about 8.8 millimeters. The front plate is equipped with a length equal to that of the side plate and rear plate. Further, the front plate has a periphery formed of a pair of elongated side edges and a pair of short end edges. One of the side edges of the front plate is integrally coupled to an outboard one of the side edges of the side plate. Another one of the side edges of the front plate remains in abutment along a bisecting line of the front surface of the rear plate. As such, a generally J-shaped cross-section is defined which in turn defines a groove with a generally triangular shaped cross-section along a length thereof.

The end of the front plate 24 that is distal from the side plate 22 preferably includes a raised edge such as is shown at 29. The raised edge facilitates manual insertion of an item into a selected position between the front plate 24 and the rear plate 20.

As shown in FIG. 2, each of the mounting assemblies has an adhesive layer 28 situated along the rear surface of the rear plate. As such, the mounting assemblies are mounted to at least one of the portions of the computer monitor. As shown in FIG. 1, the mounting assemblies are each preferably mounted on each of the portions to define a portion of a rectangle. Further, the free edges of the front plates each extend away from the screen such that pieces of paper inserted within the grooves extend away from the screen in coplanar relationship therewith. As shown in FIG. 3, a pair of the mounting assemblies are constructed with a first length and a remaining one of the mounting assemblies is constructed with a second length greater than the first length for accommodating the rectangular form of the frame of the computer monitor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A computer monitor assembly, comprising:
   a display screen;
   a housing supporting the display screen and including a frame portion that generally surrounds the perimeter of the display screen; and a holder having a back plate portion immovably secured directly onto the frame portion and including a side plate portion extending generally outward and away from the frame portion and a front plate portion that extends from the side plate portion having a distal end that is biased against the back plate portion into a holding position to hold an item between the distal end and the back plate portion.

2. The assembly of claim 1, wherein the back plate portion, the side plate portion and the front plate portion are integrally formed from a single piece of plastic material.

3. The assembly of claim 1, wherein the front plate portion has a length, a width and a thickness and wherein the thickness is continuous along the entire length and the entire width.

4. The assembly of claim 1, wherein the front plate portion has a first end at the side plate portion, a width defined between the first end and the distal end and wherein the front plate portion is rigid along the width.

5. A device for holding at least one item adjacent a computer monitor display screen, comprising:
   a rear plate portion having a back surface and a front surface with a securing means coplanar with the back surface for securing the back surface to a computer monitor;
   a side plate portion extending along the length of the rear plate portion and extending away from the rear plate portion in a direction away from the front surface; and
   a front plate portion having an edge adjacent the side plate portion and extending away from the side plate portion, the front plate portion being supported by the side plate portion such that the front plate portion is biased against the front surface of the rear plate portion adjacent an end on the front plate portion that is distal from the side plate portion, the front plate portion being rigid in a direction extending from the edge adjacent the side plate portion to the end of the front plate portion.

6. The device of claim 5, including a raised edge on the distal end of the front plate portion that is spaced from the front surface of the front plate portion to facilitate inserting an item between the front plate portion and the rear plate portion.

7. The device of claim 5, wherein the rear plate portion, the side plate portion and the front plate portion are all integrally formed from a single piece of plastic material and the front plate portion is molded with the side plate portion such that the front plate portion end is continuously biased against the rear plate portion front surface.

8. The device of claim 5, wherein the front plate portion has a length, a width and a thickness and wherein the front plate portion thickness is continuous along the entire length and width of the front plate portion.

9. The device of claim 8, wherein the front plate portion is arcuate along the width.

10. The device of claim 8, wherein the front plate portion is rigid along the entire width.

11. The device of claim 5, wherein the securing means comprises an adhesive.

12. A device for holding at least one item adjacent a display screen on a computer monitor, comprising:
   a first portion having a front face and a back face with a securing means coplanar with the back face for securing the back face to the computer monitor near the display screen;
   a second portion that is formed with and extends from an edge of the first portion such that the first and second portions form a holding channel that has a depth and a length that is substantially greater than the depth, the second portion extending the length of the holding channel, the second portion including an end that is biased against the front face of the first portion at one edge of the holding channel such that an item received in the channel is held in a selected position by the second portion end against the front face of the first portion, the second portion being rigid in a direction extending between the edge of the first portion and the end of the second portion.

13. The device of claim 12, wherein the first and second portions are a single piece of plastic material.

14. The device of claim 12, wherein the securing means comprises an adhesive on the back face of the first portion.

15. The device of claim 12, including an edge on the end of the second portion that is raised from the front face of the first portion that facilitates manually inserting an item into the holding channel.

16. The device of claim 12, wherein said first and second portions are a first cooperating set forming a first holding channel, the device including a second cooperating set of first and second portions forming a second holding channel and a third cooperating set of first and second portions forming a third holding channel.

* * * * *